United States Patent Office 3,336,282
Patented Aug. 15, 1967

3,336,282
COMPLEXES OF AZONITRILES WITH FRIEDEL-CRAFTS METAL HALIDES
Howard C. Haas, Arlington, Mass., assignor to Polaroid Corporation, Cambridge, Mass., a corporation of Delaware
No Drawing. Filed July 1, 1964, Ser. No. 379,704
6 Claims. (Cl. 260—149)

This invention relates to a novel class of polymerization initiators, and more particularly, to novel azonitrile complexes.

One object of the present invention is to provide novel complexes of azonitriles.

Another object of the present invention is to provide a novel class of polymerization initiators.

Still another object is to provide a class of polymerization initiators, the members of which are capable of decomposing at different rates and temperatures to provide free radicals.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

Azonitriles are known to be satisfactory free radical polymerization initiators for the polymerization of numerous monomers, particularly vinyl monomers. It is believed that when these compounds are employed in bulk or solution polymerization, when the monomer mixture is heated to the temperature at which the azonitrile decomposes, free radicals are generated in accordance with the following equation:

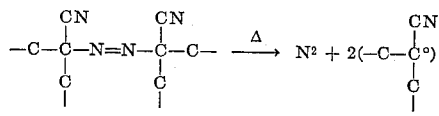

One of the disadvantages in the use of azobisisobutyronitrile or other azonitriles as polymerization initiators, is that the rate at which polymerization occurs is limited to the rate at which the azonitrile decomposes at any given temperature. Consequently, where it is desired to increase the rate of polymerization initiation at a given temperature, it is generally necessary to either add substantially more azonitrile to the reaction mixture, or resort to a different, often less satisfactory or less economical polymerization initiator.

It has now been found that azonitriles having the formula:

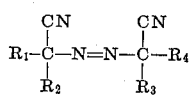

wherein each of $R_1$, $R_2$, $R_3$ and $R_4$ may be alkyl or alicyclic groups or where $R_1$ and $R_2$ or $R_3$ and $R_4$ taken together may be an alicyclic group, can be reacted with Lewis acids, and particularly, with those Lewis acids which may be characterized as Friedel Crafts agents, to provide novel chemical complexes. Substituents on $R_1$, $R_2$, $R_3$ and $R_4$ for purposes of making the novel complexes of this invention are not critical, so long as the resulting azonitrile is capable of use as a free radical polymerization initiator. As nonlimiting examples of such substituents, mention may be made of —COOH, —COOR, halogen, aryl, alicyclic, —NO$_2$, —SO$_3$H, —SO$_3$R, —SO$_2$NH$_2$, —SO$_2$NR$_2$, —OR, —CN, etc. In a preferred embodiment, $R_1$ is the same as $R_4$, and $R_2$ is the same as $R_3$; the reactant is thus a symmetrical azonitrile.

By Lewis acids, those compounds are intended which are capable of accepting and sharing a pair of electrons from electron donors. The chemical structure of the complexes of this invention varies somewhat, depending upon the choice of Lewis acid and the particular azonitrile; certain agents such as boron trifluoride and boron trichloride appear to form 2:1 complexes with azobisisobutyronitrile, for example, while others, such as stannic chloride appear to form 1:1 complexes. Where the selected Lewis acid, such as BF$_3$, is capable of accepting only one electron pair, the complex is formed by the donation of one electron pair from the nitrogen atom of the nitrile group; where the azonitrile is reacted with a stoichiometric amount of, and preferably an excess of, such a Lewis acid, all of the nitrile groups enter into complex formation to provide a complex of the following formula:

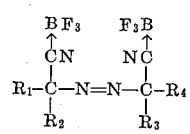

where $R_1$, $R_2$, $R_3$ and $R_4$ have the same meanings as given above. Where less than an excess of Lewis acid is employed in the reaction mixture, obviously less than all of the nitrile groups will be complexed.

Where the selected Lewis acid, as in the case of AlCl$_3$ or SnCl$_4$, is capable of accepting more than one electron pair, the structure of the resulting complex is not entirely clear. When the azonitrile is reacted with an excess of the Lewis acid, the structure of the resulting complex is believed to take one of the following forms:

(1) Monomers, having the following type of configuration:

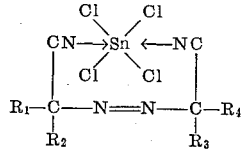

where $R_1$, $R_2$, $R_3$ and $R_4$ have the same meanings as given above;

(2) Polymers, having recurring units of the following types of configurations:

(a)

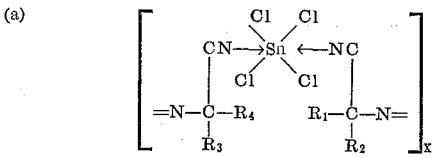

where $R_1$, $R_2$, $R_3$ and $R_4$ have the same meanings as given above, or (b)

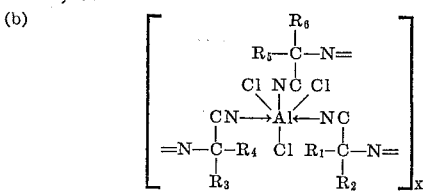

where $R_1$, $R_2$, $R_3$ and $R_4$ have the same meanings as given above, and $R_5$ and $R_6$ have the same meanings as either $R_1$ and $R_2$, respectively, or $R_3$ and $R_4$, respectively.

Upon analysis of the configurations shown in 1 and 2a, which configurations are believed to be typical of the complexes formed when the selected Lewis acid is capable of accepting two pairs of electrons, the ratio of the complex has been found in every case to be 1 Lewis acid:1 azonitrile; however, such analysis does not differentiate between monomeric and polymeric forms. Analysis of complexes such as that shown in 2b, which is believed to be basically typical of those formed where the selected Lewis acid is capable of accepting more than two pairs of electrons, reveals the ratio of Lewis acid to azonitrile to be something other than 1:1. Moreover, such complexes are pasty and amorphous in appearance, as compared with complexes formed with Lewis acids capable of accepting only one or two electron pairs, further evidencing polymer formation.

It will be noted that the azo group in the azonitrile is capable of acting as a Lewis base, and can donate at least one pair of electrons to the electron-receptive site of a Lewis acid reactant, thereby possibly establishing complex bonds in addition to those created to the nitrile group. However, in every case of azonitrile complexes of the type described in this invention, irrespective of the Lewis acid complexing agent selected, there is complex formation between said Lewis acid and the nitrile group on the azonitrile, as may be readily demonstrated by infrared analysis. Such complex formation produces characteristic changes in the infrared spectrum of the azonitrile, particularly in the shift of the nitrile band at 2240 cm.$^{-1}$ to higher wave numbers (2320–2340 cm.$^{-1}$).

While the exact structure of the complexes formed is uncertain, the complexes in every case are readily synthesized by the reaction of the azonitrile and Lewis acid under anhydrous conditions. Moreover, while the structure of the complex may vary somewhat depending upon the relative quantity of Lewis acid present in the reaction mixture, the synthesis of each complex is entirely reproducible; for any reaction mixture having a given ratio of reactants, the same product as determined by subsequent analysis may be isolated. In all cases, the structure of the complex may be characterized in that each Lewis acid molecule is chemically linked to the nitrogen atom of at least one of the nitrile groups on the azonitrile molecule, each chemical linkage being established by the donation of an electron pair by said nitrogen atom to the electron-receptive site on the acid.

Examples of azonitrile polymerization initiators which may be used in the preparation of the novel chemical complexes described in this invention include:

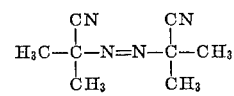

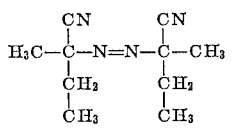

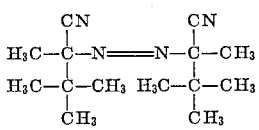

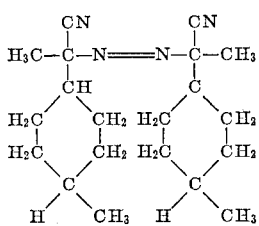

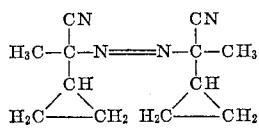

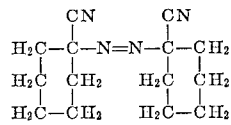

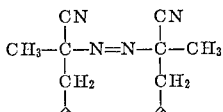

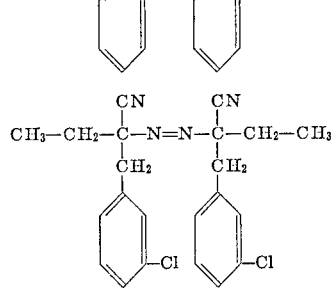

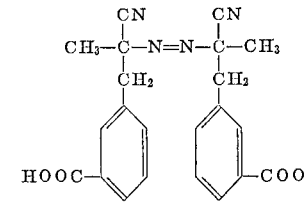

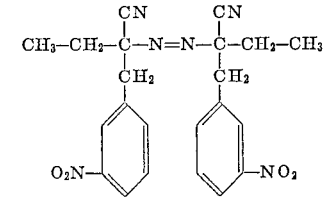

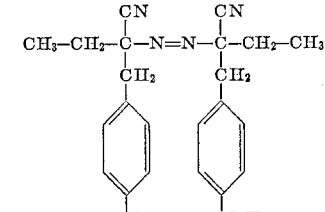

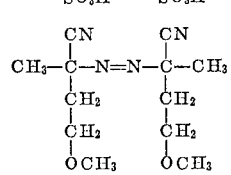

As Lewis acids which are suitable for use as complexing agents for azo nitriles in accordance with this invention, mention may be made of the metal halides, e.g., halides of tin, aluminum, boron, zinc, titanium, iron, etc.; and trimethyl boron.

It will be appreciated that the decomposition of azonitriles and the resulting formation of free radicals for polymerization initiation is achieved through the breaking of the carbon-azo bond. Moreover, it will be recognized that the conditions under which said bond can be cleaved can be made to depend largely upon the electron withdrawing effect of complexing agents present on the azonitrile molecule. Accordingly, by the proper selection of complexing agents and the preparation of the compounds described in this invention, a series of azonitrile complexes can be obtained having a spectrum of rates for thermal decomposition at any given temperature.

In addition to providing free-radical polymerization initators, the novel complexes of this invention are also suitable for use as ionic polymerization initiators in all cases where the selected Lewis acid is a Friedel-Crafts agent which is an ionic polymerization initiator in its own right. Moreover, in the same way the Lewis acid serves as a means for controlling the rate at which polymerization takes place using free radical polymerization initiators, where the monomers under consideration are those which are susceptible to ionic polymerization, the azonitrile can perform the function of a complexing modifier on the Lewis acid, thereby providing a method for regulating the rate at which ionic polymerization occurs.

Where a monomer such as styrene is sought to be polymerized, since such materials may be polymerized by either free radical or ionic polymerization, or both, the modifying and regulating effects of both the azonitrile function and the Lewis acid function of the complex may be taken advantage of.

The following non-limiting examples illustrate the preparation of the novel azonitrile complexes of this invention:

Example 1

The complex of azobisisobutyronitrile (AIBN) and stannic chloride was prepared as follows: (1 gram) of AIBN was dissolved in 10 ml. of nitromethane dried over anhydrous $CaSO_4$ and placed in a small reaction vessel equipped with a stirrer, inlet for dry nitrogen, and dropping funnel. Excess $SnCl_4$ (5 ml.) dissolved in dry nitromethane was added slowly with stirring at room temperature. The complex precipitated immediately, and was filtered off in a dry box, washed with nitromethane, and dried over paraffin and $P_2O_5$ under vacuum at 50° C.

The complex was analyzed for chlorine and nitrogen, the results of which analysis are given below. Stannic chloride was found to form a 1:1 complex with azobisisobutyronitrile.

*Analysis.*—Found: percent chlorine, 34.0; percent nitrogen, 13.18. Theoretical (for $AIBN \cdot SnCl_4$) Cl, 33.4; H, 13.21.

Complex formation was confirmed by infrared analysis, as evidenced by the fact that the nitrile band at 2240 cm.$^{-1}$ was shifted to a higher wave number, i.e., 2320 cm.$^{-1}$.

Example 2

The complex of azobisisobutyronitrile and aluminum trichloride was prepared by subliming excess aluminum trichloride into a reaction vessel and reacting it with a dry ether solution of azobisisobutyronitrile at room temperature. Complex formation was established by infrared analysis. The resulting complex was also analyzed for chlorine, with the following results:

*Analysis.*—Found: percent chlorine, 40.6. Theoretical (for 3 $AIBN \cdot 4 AlCl_3$) Cl, 41.5.

The complex was not well defined; analysis indicated it to be between 1:1 and 4 $AlCl_3$:3 azobisisobutyronitrile. Moreover, the product was pasty and amorphous in appearance. It is believed that a complex polymer was formed.

Example 3

The complex of azobisisobutyronitrile and boron trichloride was prepared by passing excess $BCl_3$ gas into a dry hexane solution of azobisisobutyronitrile at room temperature. The resulting complex was analyzed for chlorine, and was found to comprise azobisisobutyronitrile and boron trichloride in a ratio of 1:2.

*Analysis.*—Found: percent chlorine, 51.1. Theoretical (for $AIBN \cdot 2BCl_3$) Cl, 53.3.

Since certain changes may be made in the above product without departing from the scope of the invention herein involved, it is intended that all matter contained in the above description shall be interpreted as illustrative and not in a limiting sense.

What is claimed is:

1. A chemical omplex of a Friedel-Crafts agent which is a metallic halide with an azonitrile having the formula:

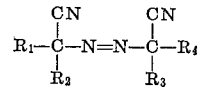

wherein each of $R_1$, $R_2$, $R_3$ and $R_4$ is a radical selected from the group consisting of a lower alkyl and a saturated mononuclear alicyclic group containing from three to six nuclear carbon atoms, inclusive, and $R_1$ and $R_2$ when taken together, and $R_3$ and $R_4$ when taken together, may comprise a saturated mononuclear alicyclic group containing from three to six nuclear carbon atoms, inclusive, said Friedel-Crafts agent being linked to the nitrogen atom of at least one of said nitrile groups by the donation of an electron pair from said nitrogen atom to the electron-receptive site of said Friedel-Crafts agent.

2. The complex defined in claim 1 wherein said azonitrile is azobisisobutyronitrile.

3. The complex defined in claim 1 wherein said azonitrile is azobisisobutyronitrile and said Friedel-Crafts agent is stannic chloride.

4. The complex as defined in claim 1 wherein said azonitrile is azobisisobutyronitrile and said Friedel-Crafts agent is aluminum trichloride.

5. The complex as defined in claim 1 wherein said azonitrile is azobisisobutyronitrile and said Friedel-Crafts agent is boron trichloride.

6. A chemical complex of lower trialkyl boron with an azonitrile having the formula:

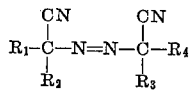

wherein each of $R_1$, $R_2$, $R_3$, and $R_4$ is a radical selected from the group consisting of a lower alkyl and a saturated, mononuclear alicyclic group containing from three to six nuclear carbon atoms, inclusive, and $R_1$ and $R_2$ when taken together, and $R_3$ and $R_4$ when taken together, may comprise a saturated, mononuclear alicyclic group containing from three to six nuclear carbon atoms, inclusive, said lower trialkyl boron being linked to the nitrogen atom of at least one of said nitrile groups by the donation of an electron pair from said nitrogen atom to the electron-receptive site of said lower trialkyl boron.

References Cited

UNITED STATES PATENTS 3,041,324 6/1962 DeCoene et al.

OTHER REFERENCES

Imoto et al.: C. A., volume 59, page 766e (1963).
Yoshida et al.: C. A., volume 60, page 14609f (1963).

CHARLES B. PARKER, *Primary Examiner.*

FLOYD D. HIGEL, *Assistant Examiner.*